United States Patent
Wang (10) Patent No.: US 6,523,223 B2
(45) Date of Patent: Feb. 25, 2003

(54) HINGE FOR A FOLDABLE BICYCLE

(76) Inventor: Ping-Tien Wang, 15th Fl., No. 135, Ching Tung St., Tainan (TW)

( * ) Notice: Subject to any disclaimer, the term of this patent is extended or adjusted under 35 U.S.C. 154(b) by 0 days.

(21) Appl. No.: 09/893,497

(22) Filed: Jun. 29, 2001

(65) Prior Publication Data

US 2003/0000045 A1 Jan. 2, 2003

(51) Int. Cl.$^7$ .............................................. E05D 11/10
(52) U.S. Cl. ............................ 16/324; 16/319; 16/326; 280/287
(58) Field of Search ......................... 16/324, 326, 319, 16/380; 280/287

(56) References Cited

U.S. PATENT DOCUMENTS

| | | | | |
|---|---|---|---|---|
| 3,791,672 A | * | 2/1974 | Pera | 180/287 |
| 3,803,668 A | * | 4/1974 | Remick | 16/128 R |
| 4,116,514 A | * | 9/1978 | Lawrence | 16/173 |
| 4,175,315 A | * | 11/1979 | Hayes, Sr. et al. | 16/169 |
| 4,182,522 A | * | 1/1980 | Ritchie | 180/278 |
| 4,417,745 A | * | 11/1983 | Shomo | 180/287 |
| 4,573,239 A | * | 3/1986 | Valenti et al. | 16/273 |
| 4,697,306 A | * | 10/1987 | Rhodes | 16/317 |
| 4,911,458 A | * | 3/1990 | Lin et al. | 280/287 |
| 5,007,134 A | * | 4/1991 | Stanford | 16/266 |
| 5,058,236 A | * | 10/1991 | Henson | 16/222 |
| 5,590,895 A | * | 1/1997 | Hiramoto | 280/278 |
| 5,975,551 A | * | 11/1999 | Montague et al. | 280/287 |
| 6,116,629 A | * | 9/2000 | Koppensteiner | 280/287 |
| 6,270,103 B1 | * | 8/2001 | Grimm | 280/278 |
| 6,317,928 B1 | * | 11/2001 | Guillemette | 16/353 |
| 6,394,479 B1 | * | 5/2002 | Liu | 280/287 |

FOREIGN PATENT DOCUMENTS

| | | | | |
|---|---|---|---|---|
| EP | 112158 A1 | * | 2/2000 | B62K/13/02 |
| FR | 2594880 | * | 2/1986 | E05F/5/00 |
| JP | 2991171587 A | * | 6/2002 | B62K/15/00 |

* cited by examiner

*Primary Examiner*—Thomas B. Will
*Assistant Examiner*—Alexandra K. Pechhold
(74) *Attorney, Agent, or Firm*—Bacon & Thomas (57) ABSTRACT

A hinge for a foldable bicycle includes a first plate and a second plate each having a side pivotally attached to each other. A quick release device is mounted on one of the two plates to hold the other plate in place when the two plates abut each other. The hinge for a foldable bicycle includes a lock bolt movably mounted in one of the two plates and a hole defined in the other plate. The lock bolt is inserted into the hole after the two plates abutting each other to prevent the two plates from moving away from each other when the quick release device is inadvertently released.

5 Claims, 9 Drawing Sheets

FIG. 12
PRIOR ART

HINGE FOR A FOLDABLE BICYCLE

BACKGROUND OF THE INVENTION

1. Field of the Invention

The present invention relates to a hinge, and more particularly to a hinge for a foldable bicycle.

2. Description of Related Art

Figure 11:
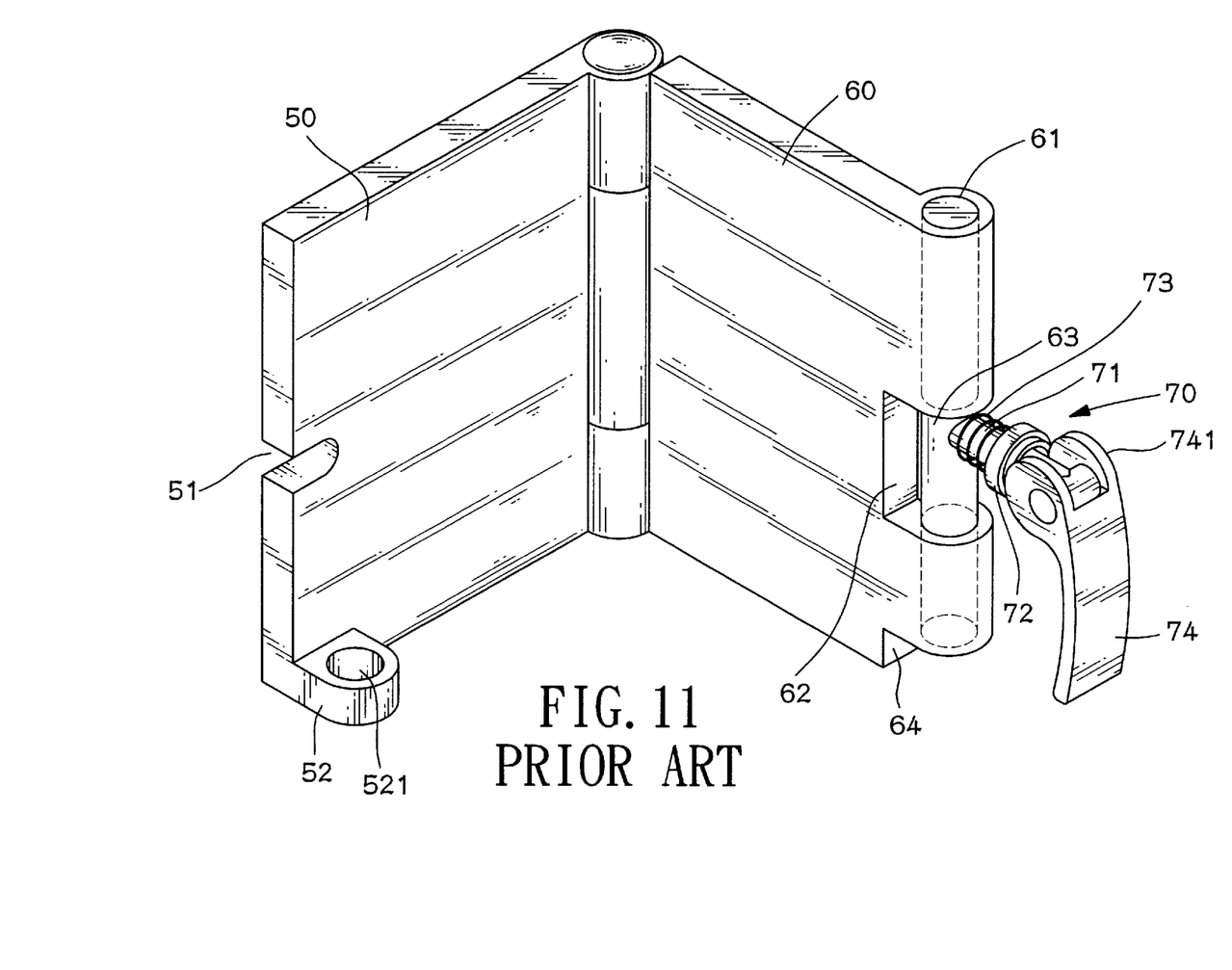
FIG. 11 is a perspective view of a conventional hinge for a foldable bicycle in accordance with the prior art.
Figure 12:
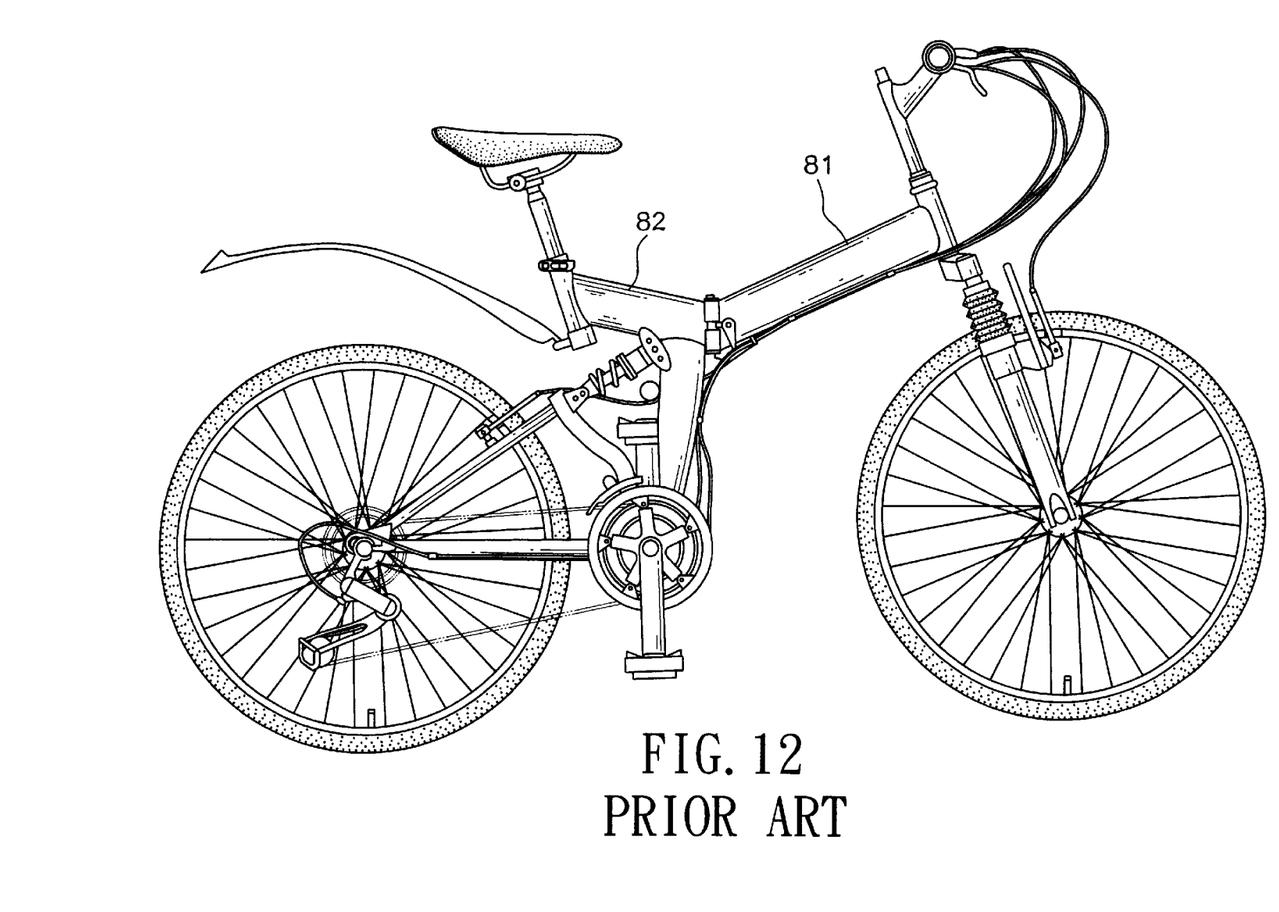
FIG. 12 is a side plan view of a foldable bicycle showing where the hinge is mounted.

With reference to FIGS. 11 and 12, a conventional hinge for a foldable bicycle in accordance with the prior art comprises a first plate (50) and a second plate (60). Each plate (50, 60) has a first side (not numbered) pivotally attached to each other, a second side (not numbered) opposite to the first side, an inner face (not numbered) and an outer face (not numbered). Each second side has a top and a bottom. A central notch (51) is defined in the second side (not numbered) of the first plate (50). The second plate (60) includes a hole (61), a central recess (62) and a corner recess (64). The hole (61) is defined longitudinally near the second side (not numbered) of the second plate (60), and the central recess (62) is defined deep enough in the second side of the second plate (60) to fully expose the hole (61). The central recess (62) has a top and a bottom such that the bottom of the central recess (62) corresponds to the notch (51) in the second side of the first plate (50). A lock bolt (63) is slidably and rotatably mounted in the hole (61) and extends through the central recess (62) near the second side of the second plate (60).

A quick release latch lock (70) is attached to the lock bolt (63). The quick release latch lock (70) includes a rod (71), a compression collar (72), a spring (73) and a lever (74). The rod (71) is attached to and radially extends from the lock bolt (63) out of the central recess (62) and corresponds to the notch (51) in the second side of the first plate (50) when the rod (71) is pressed to the bottom of the central recess(62). The compression collar (72) is slidably mounted around the rod (71). The spring (73) is mounted between the compression collar (72) and the lock bolt (63). A lever (74) with an eccentric head (741) is pivotally mounted on the end of the rod (71) to hold the compression collar (72) on the rod (71).

An ear (52) is formed perpendicular to the inner face of the first plate (50) and corresponds to the comer recess (64) in the second plate (60). A locking hole (521) the same size as the hole (61) near the second side of the second plate (60) is formed in the ear (52) to align with the hole (61) when the first and second plates (50, 60) are pressed together. When the rod (71) is pressed to the bottom of the central recess (62), the lock bolt (63) extends into the locking hole (521). The lock bolt (63) and rod (71) are rotated to move the rod (71) into the notch (51) in the first plate (50). The lever (74) is depressed, and the eccentric head (741) securely presses the compression collar (72) against the outer face of the first plate (50) to lock the lock bolt (63) in place.

With reference to FIG. 12, to operate the conventional hinge for a foldable bicycle with a front frame (81) and a rear frame (82), the first plate (50) and the second pate (60) are respectively secured on the front frame (81) and the rear frame (82). The two plates (50,60) abut each other, the rod (71) is moved into the notch (51), and the quick release device(70) is locked in position when the foldable bicycle is used. However, the quick release device (70) is locked by pulling down a lever (not numbered) so that the quick release device (70) may unlock when the lever is pulled up when the bicycle is ridden. It is very dangerous to the rider.

The present invention has arisen to mitigate and/or obviate the disadvantages of the conventional hinge for a foldable bicycle.

SUMMARY OF THE INVENTION

The main objective of the present invention is to provide an improved hinge for a foldable bicycle. The hinge for a foldable bicycle in accordance with the present invention can promote the safety of the foldable bicycle. To achieve the objective, the hinge for a foldable bicycle in accordance with the present invention includes a first plate and a second plate each having a first side pivotally mounted to each other. An ear laterally extends from the first plate and has a hole defined in the ear. A recess is defined in a second side of the second plate to divide the second side of the second plate into an upper portion and a lower portion. A cavity is longitudinally defined in the upper portion of the second side of the second plate and a through is longitudinally defined in the lower portion of the second plate. The cavity and the through hole axially align with each other so that a lock bolt is rotatably and movably received in the cavity and the through hole. A quick release device is attached to the lock bolt in the recess of the second plate to drive the lock bolt. The lock bolt is driven and moved in the cavity and the through hole by means of a drive element and a guiding element that are respectively formed on the lock bolt and second plate so the that lock bolt can be moved and into the hole in the ear of the first plate to lock the second plate after the first plate and the second plate abutting each other. The hinge for a foldable bicycle promotes the safety of the foldable bicycle and prevent the first and the second plate from pivotally moved to each other due to the lock bolt locked in the hole of the ear of the first plate when the quick release device is released carelessly.

Further benefits and advantages of the present invention will become apparent after a careful reading of the detailed description with appropriate reference to the accompanying drawings.

DETAILED DESCRIPTION OF THE INVENTION

Figure 1:
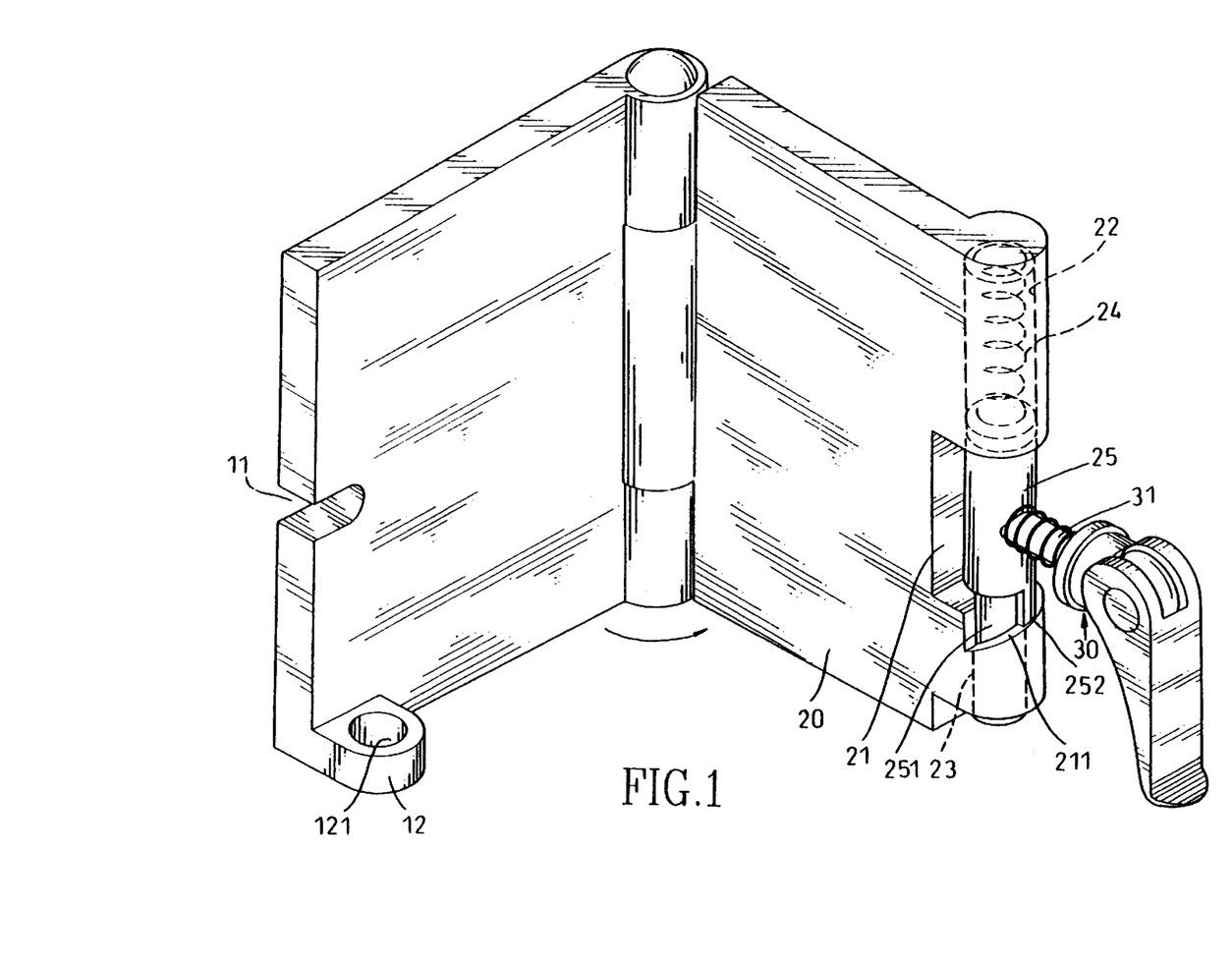
FIG. 1 is a perspective view of a hinge for a foldable bicycle in accordance with the present invention.
Figure 2:
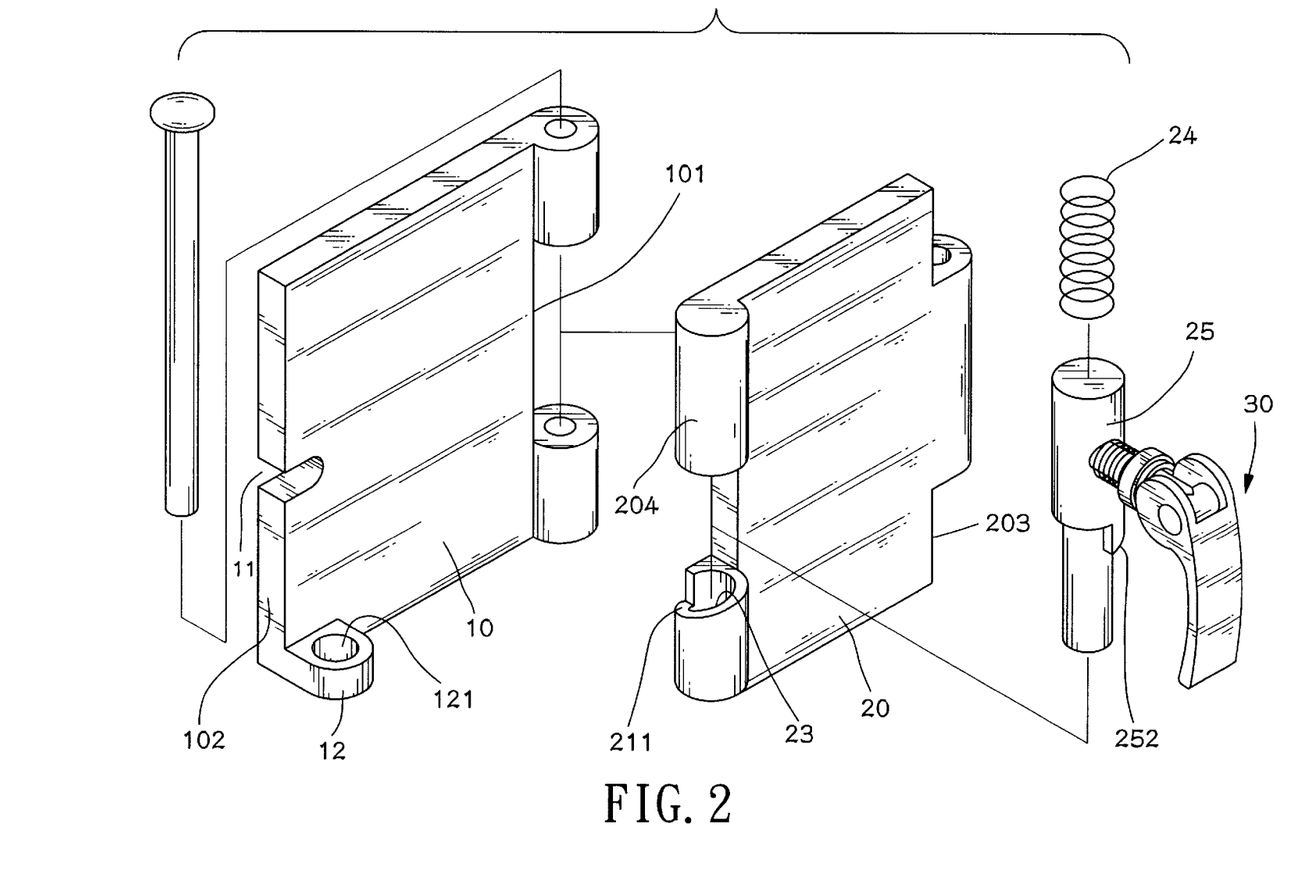
FIG. 2 is an exploded perspective view of the hinge for a foldable bicycle in FIG. 1.

With reference to the drawings and initially to FIGS. 1 and 2, a hinge for a foldable bicycle in accordance with the present invention comprises a first plate (10), a second plate (20) and a locking device. The first plate (10) and the second plate (20) are pivotally connected to each other and are adapted to be respectively secured on a front frame and a rear frame of a foldable bicycle.

The first plate (10) has a first side (101) connected to the second plate (20) and a second side (102) having a notch (11) defined in the middle portion of the second side of the first plate (10). The first and second sides (101, 102) have a top and a bottom. Each of the first and second plate (10, 20) has an inner face, an outer face, a top and a bottom. The inner faces of the first and second plates (10, 20) face each other. An ear (12) extends perpendicular from the inner face of the first plate (10) at the bottom of the second side of the first plate (10). A locking hole (121) is defined in the ear (12) parallel to the inner face of the first plate (10).

The second plate (20) has a first side (203) connected to the first side (101) of the first plate (10) and a second side (204) having a central recess (21) defined to correspond to the notch (11) in the second side (102) of the first plate (10) and dividing the second side (203) of the second plate (20) into an upper portion and a lower portion. A cavity (22) is defined longitudinally in the upper portion of the second side (204) of the second plate (20). A hole (23) is defined in and extends through the lower portion of the second side (204) of the second plate (20). The central recess (21) has a top and a bottom surface. The bottom surface corresponding to the hole (23) forms a spiral edge (211) around the top of the hole (23). The cavity (22) and the hole (23) axially align with each other and respectively communicate with the central recess (21) in the second side (204) of the second plate (20). The hole (23) has a diameter smaller than that of the cavity (22).

The lock device comprises a lock bolt (25), a rod (31), a biasing member, a compression collar and a locking lever. A lock bolt (25) has a first end rotatably movably received in the cavity (22) to press a resilient device (24) that is compressively received in the cavity (22) and a second end having a stub (251) axially extending to be rotatably movably received in the hole (23) of the second plate (20). The lock bolt (25) includes a protrusion (252) extending from the second end and sliding on the spiral edge (211) of the recess (21). The hinge in accordance with the present invention further includes a quick release device (30) attached to the lock bolt (25) to drive and rotate the lock bolt (25) to make the protrusion (252) on the lock bolt (25) slide on the spiral edge (211) of the recess (21). The quick release device (30) includes a rod (31) attached to and extending perpendicular from the lock bolt (25) and corresponding to the notch (11) in the first plate (10).

Figure 3:
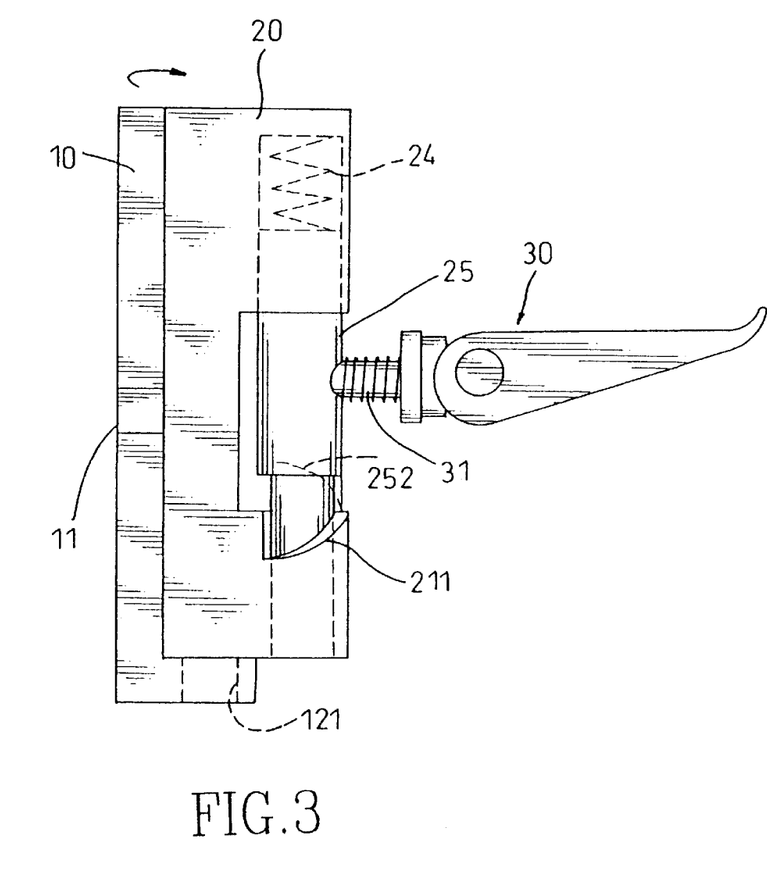
FIG. 3 is a side operational view of the hinge for a foldable bicycle in FIG. 1 when the quick release device is released.
Figure 4:
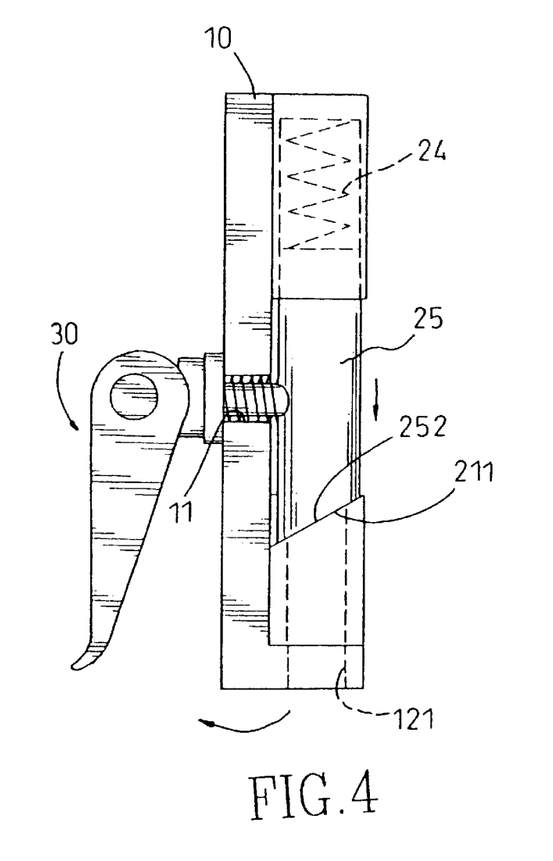
FIG. 4 is a side plan view of the hinge for a foldable bicycle in FIG. 1 when the quick release device is locked.

With reference to FIGS. 3 and 4, to operate the hinge, the first plate (10) and the second plate (20) are pivoted to abut each other. The rod (31) is moved into the notch (11) in the first plate (10) and rotates the lock bolt (25) and the stub (252). Then the protrusion (252) slides on the spiral edge (211) from a high point to a low point so that the stub (251) extends out from the hole (23) in the second plate (20) to be received in the locking hole (121) to engage the first plate (10) and the second plate (20).

Figure 5:
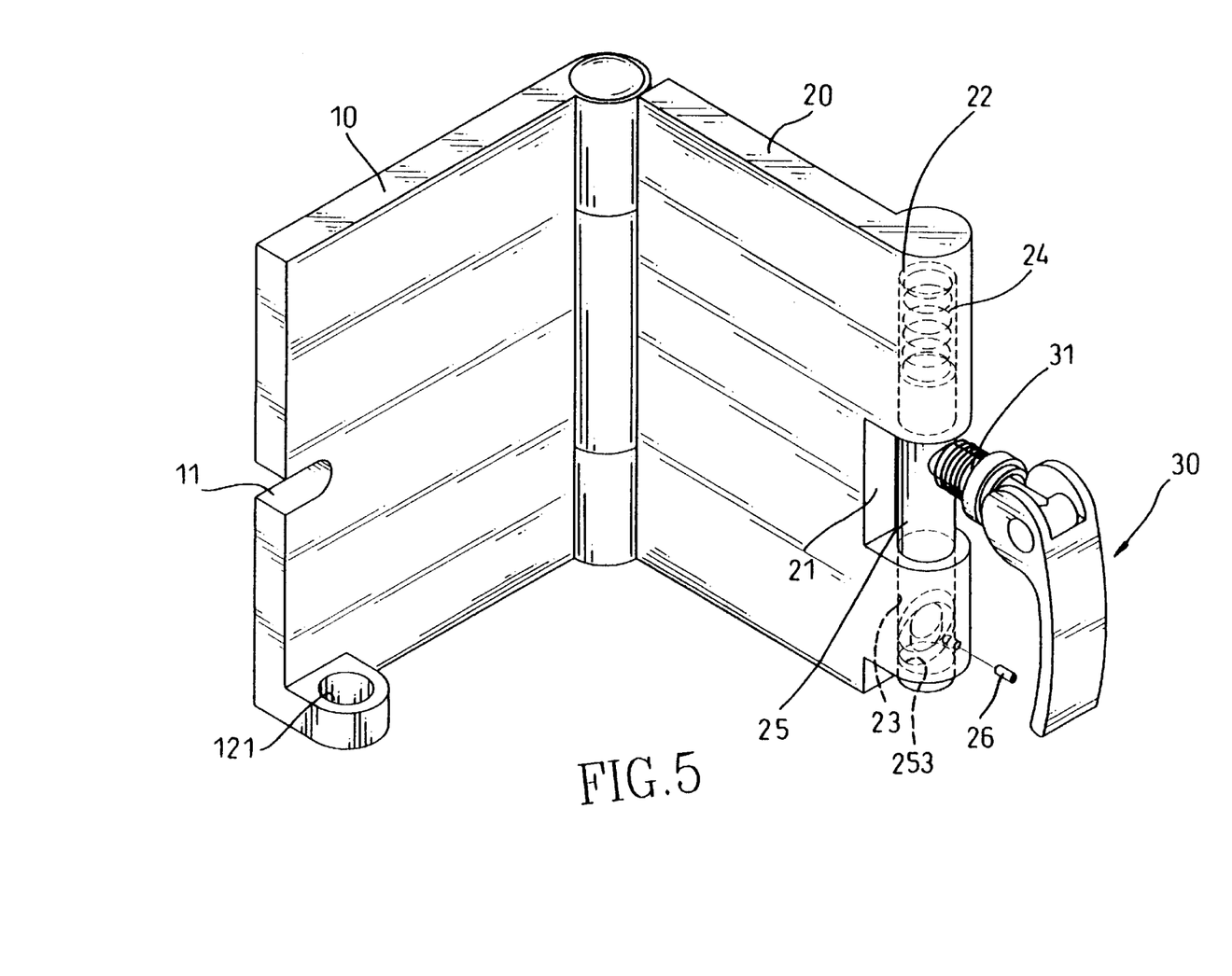
FIG. 5 is perspective view of a second embodiment of the hinge for a foldable bicycle in accordance with the present invention.

With reference to FIG. 5, it is another embodiment of the hinge in accordance with the present invention. The lock bolt (25) has a first end rotatably received in the cavity (22) in the second plate (20) and a second end rotatably received in the hole (23). The lock bolt (25) has an annular inclined groove (253) defined in a periphery and near the end of the lock bolt (25). A pin (26) is secured in the periphery of the second side of the second plate (20) and has one end extending into a lower portion of the inclined groove (253).

Figure 6:
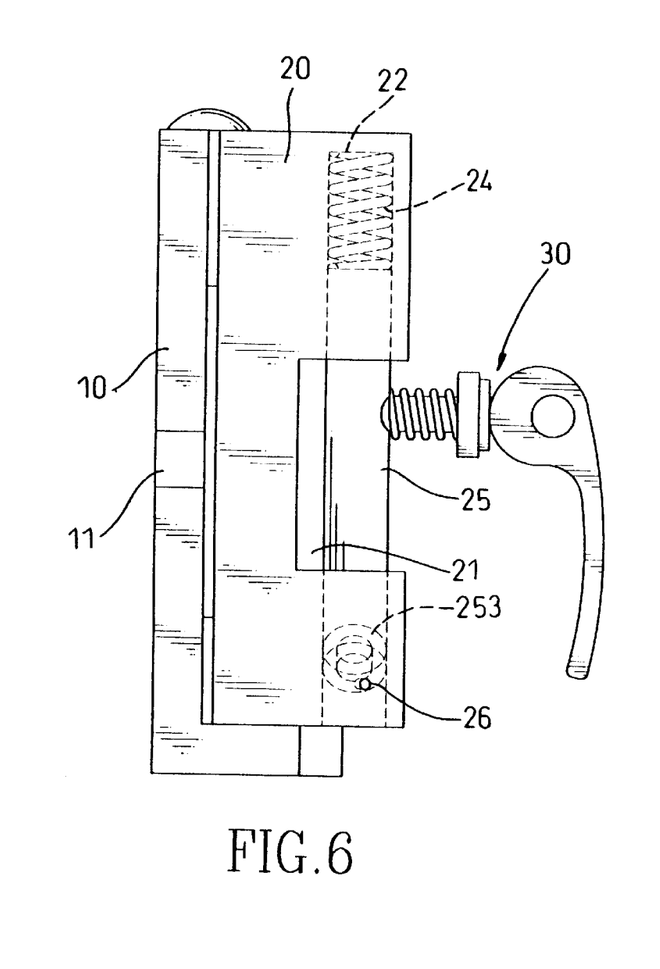
FIG. 6 is a side operational of the hinge for a foldable bicycle in FIG. 5 when the quick release device is released.
Figure 7:
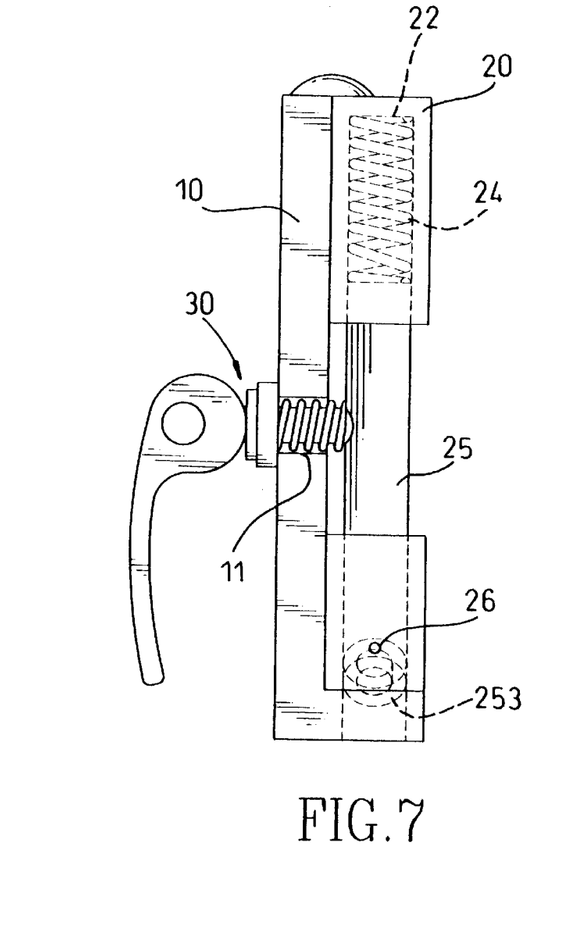
FIG. 7 is a side plan view of the hinge for a foldable bicycle in FIG. 5 when the quick release device is locked.

To operate the hinge, with reference to FIGS. 6 and 7, the first plate (10) and the second plate (20) are moved to abut each other. The actuated rod (31) is moved to be received in the notch (11) of the first plate (10) and rotates the lock bolt (25) and the stub (252). Then the pin (26) is received in a upper portion of the inclined groove (253) so that the second end of the lock bolt (25) is moved to insert into the locking hole (121) to engage the first plate (10) and the second plate (20).

Figure 8:
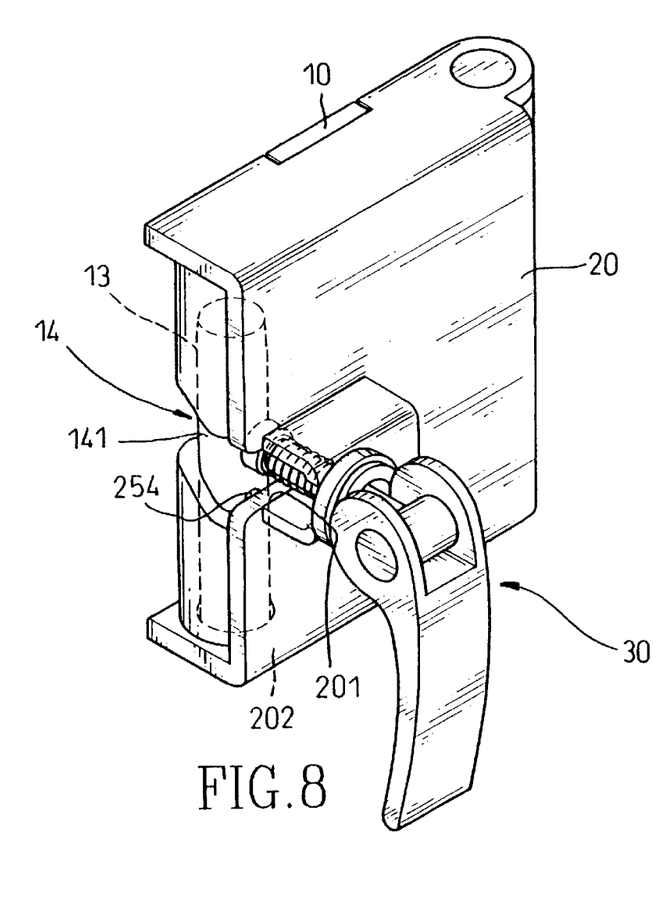
FIG. 8 is perspective view of a third embodiment of the hinge for a foldable bicycle in accordance with the present invention.
Figure 9:
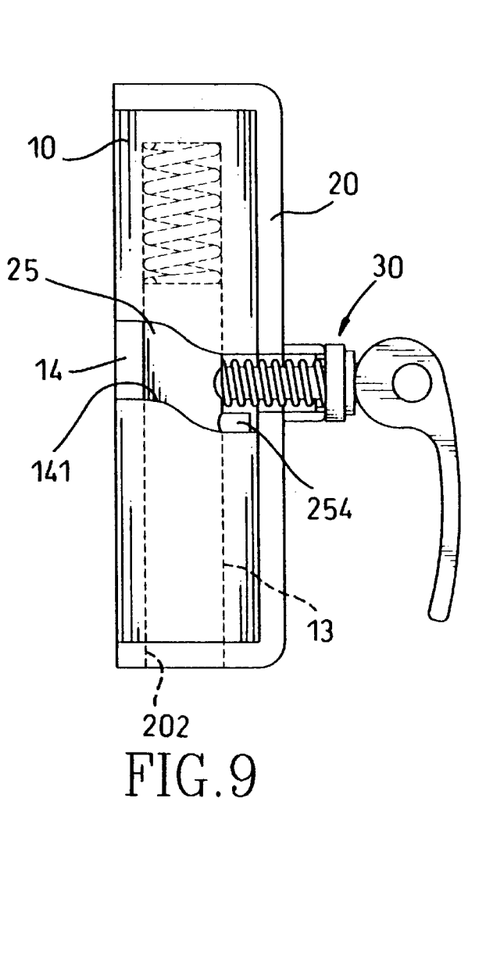
FIG. 9 is a side plan view of the hinge for a foldable bicycle in FIG. 8.

With reference to FIGS. 8 and 9, a third embodiment of the hinge for a foldable bicycle in accordance with the present invention has the first plate (10) having a first side pivotally connected to the first side of the second plate (20) and a second side having a blind hole (13) defined to receive the lock bolt (25). A groove (14) is laterally defined in the second side of the first plate (10) and communicates with the blind hole (13). An inclined edge (141) is formed on a lower side of the groove (14). A stub (254) is attached to an outer periphery of the lock bolt (25) and slides on the inclined edge (141) of the groove (14) in the second side of the first plate (10) to make the lock bolt (25) moved up and down in the blind hole (13). The second plate (20) has a hole (202) defined in a lower portion to receive the lock bolt (25) when the lock bolt (25) is moved down.

Figure 10:
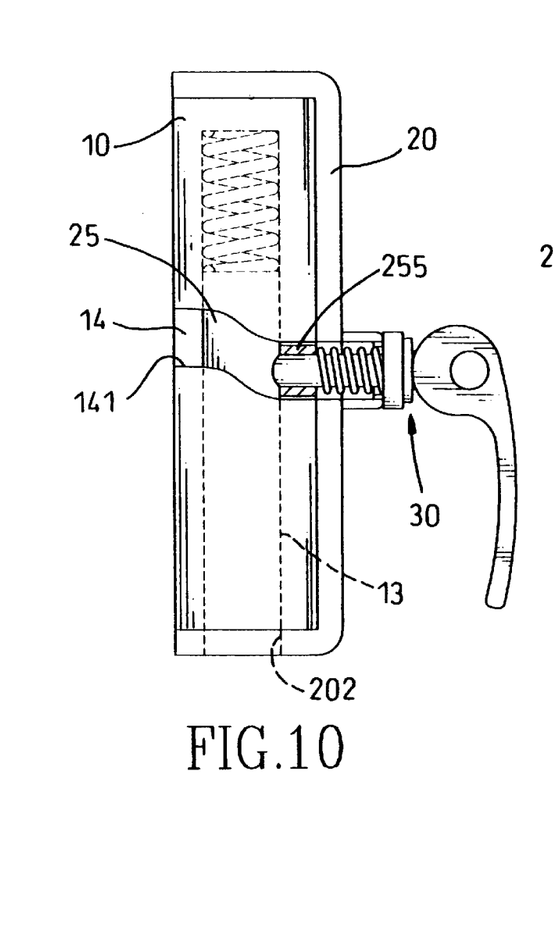
FIG. 10 is a side plan view of a fourth embodiment of the hinge for a foldable bicycle.

With reference to FIG. 10, a fourth embodiment in accordance with the present invention has a sleeve (255) on the rod (31) of the quick release device (30) that slides on the inclined edge (141) to make the lock bolt (25) moved up and down to be selectively received in the hole (202).

Although the invention has been explained in relation to its preferred embodiment, it is to be understood that many other possible modifications and variations can be made without departing from the spirit and scope of the invention as hereinafter claimed.

What is claimed is:

1. A hinge for a foldable bicycle, comprising:
a first plate having first and second opposed sides, said first plate including an ear having a through hole formed therethrough and perpendicularly projecting from a lower surface of said second side, said second side including a notch formed in a central portion thereof,
a second plate having first and second opposed sides, said first side of said second plate being pivotally attached to said first side of said first plate, said second side of said second plate having upper and lower portions and including a recess formed therein, said recess corresponding to said notch in said second side of said first plate, said upper portion having a cavity formed therein, said lower portion having a hole formed therethrough, said hole being axially aligned with said cavity and said through hole in said ear when said first plate and said second plate abut each other; and,
a locking device having a lock bolt and a quick release device, said lock bolt including first and second opposed ends, said first end being rotatably received in said cavity, said second end being rotatably received in said hole of said second side of said second plate, said quick release device being attached to said lock bolt and including an actuated rod, said actuated rod being fixedly secured to said lock bolt and extending into said recess of said second plate, whereby said lock bolt is rotatably received in said through hole of said ear by a drive element and a guiding element when said actuated rod of said quick release device is actuated.

2. The hinge for a foldable bicycle as claimed in claim 1, wherein said drive element and said guiding element are two corresponding spiral edges.

3. The hinge for a foldable bicycle as claimed in claim 1, wherein said drive element is a pin and said guiding element is a spiral groove, said pin having a free end being received in said spiral groove.

4. The hinge for a foldable bicycle as claimed in claim 3, wherein said pin extends through said lower portion of said second plate and said spiral groove is disposed in said lock bolt to receive a free end of said pin.

5. The hinge of a foldable bicycle as claimed in claim 1, wherein said drive element is a rod of said quick release device sliding on said guiding element that is a spiral groove.

* * * * *